United States Patent
Vermeulen et al.

(10) Patent No.: US 11,452,296 B2
(45) Date of Patent: Sep. 27, 2022

(54) APPARATUS AND METHOD FOR THE INDUSTRIAL MANUFACTURE OF BAKERY PRODUCTS

(71) Applicant: Kaak Groep B.V., Terborg (NL)

(72) Inventors: Jan Vermeulen, Nieuwkuijk (NL); Nigel Justin Morris, Nieuwkuijk (NL)

(73) Assignee: KAAK GROEP B.V., Terborg (NL)

( * ) Notice: Subject to any disclaimer, the term of this patent is extended or adjusted under 35 U.S.C. 154(b) by 758 days.

(21) Appl. No.: 16/382,969

(22) Filed: Apr. 12, 2019

(65) Prior Publication Data

US 2019/0313650 A1    Oct. 17, 2019

(30) Foreign Application Priority Data

Apr. 13, 2018 (NL) ..................... 2020763

(51) Int. Cl.
| | |
|---|---|
| *A23L 3/18* | (2006.01) |
| *A21B 1/02* | (2006.01) |
| *A21B 1/48* | (2006.01) |
| *A21B 7/00* | (2006.01) |
| *B65G 19/22* | (2006.01) |
| *B65G 25/08* | (2006.01) |

(52) U.S. Cl.
CPC .................. *A21B 1/48* (2013.01); *A21B 1/02* (2013.01); *A21B 7/005* (2013.01); *B65G 19/22* (2013.01); *B65G 25/08* (2013.01)

(58) Field of Classification Search
CPC ................ A23L 3/18; A21B 1/02; A21B 1/48
USPC ........................................ 99/443 C; 426/496
See application file for complete search history.

(56) References Cited

U.S. PATENT DOCUMENTS

| | | |
|---|---|---|
| 1,534,617 A | 4/1925 | Streich |
| 2,035,188 A | 3/1936 | Quick |
| 4,025,273 A | 5/1977 | Mauer et al. |
| 4,440,701 A | 4/1984 | Ohki et al. |
| 4,750,413 A * | 6/1988 | Voegtlin ................. A21C 7/01 99/353 |
| 6,080,438 A | 6/2000 | Hyllstam et al. |

(Continued)

FOREIGN PATENT DOCUMENTS

WO    2017157628 A1    9/2017

OTHER PUBLICATIONS

US 2011/0059211 A1, Chandi et al., Mar. 10 (Year: 2011).*
Netherlands Search Report from NL Application No. 2020763, dated Oct. 24, 2018.

*Primary Examiner* — Douglas A Hess
(74) *Attorney, Agent, or Firm* — Workman Nydegger

(57) ABSTRACT

An apparatus and method are provided for the industrial manufacture of bakery products, such as long or elongated breads, rolls, baguettes, Parisian breads, round loaves. The apparatus includes a conveyor for conveying at least one piece of dough on a conveying surface in a transport direction, a substrate which is arranged above said conveyor. The substrate includes a contact surface at a side facing the conveyor. The apparatus is configured for providing a relative movement between the contact surface and the conveying surface. The contact surface is configured for touching an upper side of said at least one piece of dough on said conveying surface. And the apparatus further includes a heating device configured for heating at least a part of a circumference of the at least one piece of dough facing the contact surface for forming a film on said part of the circumference.

20 Claims, 6 Drawing Sheets

(56) References Cited

U.S. PATENT DOCUMENTS

| | | | |
|---|---|---|---|
| 6,248,384 B1 * | 6/2001 | Morikawa | A21C 7/01 |
| | | | 426/496 |
| 7,015,436 B2 * | 3/2006 | Fila | A21B 1/48 |
| | | | 219/388 |
| 7,306,444 B2 * | 12/2007 | Heinzen | A21B 1/48 |
| | | | 425/371 |
| 8,507,026 B2 * | 8/2013 | Juravic | A23K 10/20 |
| | | | 426/646 |
| 8,846,124 B2 * | 9/2014 | Heinzen | A21C 11/006 |
| | | | 426/502 |
| 9,826,762 B2 * | 11/2017 | Heinzen | A23L 5/30 |

* cited by examiner

APPARATUS AND METHOD FOR THE INDUSTRIAL MANUFACTURE OF BAKERY PRODUCTS

BACKGROUND

The invention relates to an apparatus and method for the industrial manufacture of bakery products, such as long or elongated breads, rolls, baguettes, Parisian breads, round loaves, etc. . . .

In the production of bakery product, and in particular in the production of bread, a dough is prepared which dough undergoes a large number of process steps until the final bakery product is obtained. Examples of such process steps are, dough sheeting, dividing of the dough in individual dough pieces, forming the dough pieces in a desired shape, proofing, molding, final proofing, baking, cooling, packing, etc. . . . Accordingly, the production of bakery product usually requires an assembly of different production apparatuses and many transfers of the dough or of the dough pieces between said apparatuses. Usually each of said apparatuses comprises dedicated carriers for conveying the dough or dough pieces through said apparatus, and the dough or dough pieces need to be transferred between different carriers in the assembly.

Such transfers are restrictive because they require handling of the products themselves, either in the form of the dough or of the dough pieces before baking, or in the form of baked or prebaked bakery products after baking, at different stages of the manufacturing process. The handling is difficult, especially upstream of the oven. In addition, because of the stickiness of the dough, these transfers and the handling of the dough or dough pieces generate product degradation.

In order to substantially prevent the dough to stick to components of the apparatus and/or carriers in the assembly for the industrial manufacture of bakery products, such components and/or carriers can be provided with a non-stick coating. Modern coatings provide a high resistance to abrasion, chemicals and corrosion, and ensure a long lifespan of the components and/or carriers. However, in the long run, used components and/or carriers need to be replaced for new ones or need to be re-coated.

In addition or alternatively, the dough or dough pieces and/or the components and/or carriers in the assembly for the industrial manufacture of bakery products are floured abundantly. There are at least three major disadvantages to the flouring, especially in the field of industrial production of bakery products:

excessive flour on the carrier for dough pieces constitutes a thermal insulator and limits the heat exchange between the carrier and the bottom of a dough piece, which may deteriorate the quality of the crust on the bottom of the finished product;

flouring may give rise to pollution throughout an industrial production circuit, and in particular, flouring and flour dust in suspension in the air may increase the risk of catching fire;

fouling of the rising and/or baking carriers or supports by the flouring require to wash and dry said carrier or supports frequently.

SUMMARY OF THE INVENTION

It is an object of the present invention to provide a method and an apparatus which make it possible to at least substantially prevent pieces of dough from sticking to the carriers or supports, in particular the carriers or supports used during proofing and/or baking, substantially without needing to flour either the dough itself or the carriers or supports.

According to a first aspect, the present invention provides an apparatus for the industrial manufacture of bakery products, such as long or elongated breads, rolls, baguettes, Parisian breads, round loaves, etc., wherein said apparatus comprising:

a conveyor for conveying at least one piece of dough on a conveying surface in a transport direction, a substrate which is arranged above said conveyor, wherein the substrate comprises a contact surface at a side facing the conveyor, wherein the apparatus is configured for providing a relative movement between the contact surface and the conveying surface, wherein the contact surface is configured for touching an upper side of said at least one piece of dough on said conveying surface, a heating device configured for heating at least a part of a circumference of the at least one piece of dough facing the contact surface for forming a film on said part of the circumference, and wherein the apparatus is configured for providing a rectilinear alternating movement between the contact surface and the conveying surface in a direction substantially parallel to the conveying surface and substantially perpendicular to the transport direction.

By providing a relative movement between the contact surface and the conveying surface, the at least one piece of dough arranged in between said contact surface and said conveying surface is rotated or rolled. By carefully controlling the relative movement between the contact surface and the conveying surface, the part of the circumference of the at least one piece of dough which comes into contact with the contact surface of the substrate for forming a film on said part of the circumference, can be controlled. Also the speed of rolling the at least one piece of dough can be controlled, and with that the timing and amount of heating of the part of a circumference of the at least one piece of dough. For example, in order to provide sufficient time for forming the film or skin, the relative movement between the contact surface and the conveying surface is relatively slow and/or reciprocating.

Accordingly, the apparatus of the invention is configured for creating a film on a part of the circumference of the at least one piece of dough. In particular, at the part of the circumference of the at least one piece of dough which is subjected to the heating, a film or skin is established. At the part of the circumference of the at least one piece of dough where the film or skin is created, the stickiness of the dough is reduced. By using the part of the circumference of the at least one piece of dough where the film or skin is created for arranging the piece of dough onto a carrier or support for conveying the piece of dough further through the assembly for the industrial manufacture of bakery products, it is at least substantially prevent that pieces of dough stick to the carriers or supports, and the carriers or support can be used substantially without needing flouring either the dough pieces itself or the carriers or supports.

In an embodiment, the heating device is configured for heating at least a part of the contact surface of the substrate. Accordingly, the part of the circumference of the at least one piece of dough is heated to generate a film or skin on said part of the circumference through contact with the heated contact surface of the substrate. In an embodiment, the heating device is configured for heating the contact surface of the substrate to a temperature of between 80° C. and 180° C., preferably to a temperature of between 90° C. and 150° C.

In an embodiment, the apparatus comprises a driving unit for subjecting the contact surface to the rectilinear alternating movement in the direction substantially parallel to the conveying surface and substantially perpendicular to the transport direction. By subjecting the contact surface to the rectilinear alternating movement, the pieces of dough which are in contact with the contact surface are rolled to and fro over conveying surface. Accordingly, different parts of the circumference of the dough pieces are subsequently and repeatedly arranged facing the contact surface and are heated by the heating device for forming a film thereon.

In an embodiment, the apparatus is configured for moving the contact surface in a direction substantially transverse to the conveying surface. In an embodiment, the apparatus comprises an actuator for raising and lowering the contact surface with respect to the conveying surface. By moving the contact surface in the direction substantially transverse to the conveying surface, the contact surface can be raised and lowered. By raising the contact surface to a position such that the distance between the contact surface and the conveying surface is larger than the thickness of the pieces of dough, the pieces of dough can be conveyed by the conveyor to pass underneath the substrate, in particular so that the substrate does not touch the pieces of dough. By lowering the contact surface to a position such that the contact surface touches the upper side of the dough pieces below the contact surface, the pieces of dough which are in contact with the contact surface can be rolled to and fro over conveying surface. Accordingly, the distance between the contact surface and the conveying surface can be controlled by this relative movement in a direction substantially transverse to the conveying surface. Alternatively or in addition, by carefully controlling the distance between the contact surface and the conveying surface, the amount of force and/or pressure applied on the at least one piece of dough which is arranged in between the contact surface and conveying surface, can be controlled.

In an embodiment, the substrate comprises a plate, preferably wherein said plate extends substantially perpendicular to said conveying direction. Preferably the heating device is arranged for heating at least part of the plate, which heated plate allows to heat at least the part of the circumference of the at least one piece of dough which is in contact with the heated part of the plate.

In an embodiment, the apparatus is configured for handling dough pieces having a central axis and which are substantially cylindrical around said central axis, wherein apparatus is configured for arranging the dough pieces in a substantially parallel arrangement onto the conveying surface with their central axis substantially parallel to the conveying surface, wherein the apparatus is configured for providing a relative movement between the contact surface and the conveying surface in a direction substantially transverse to the central axis and parallel to the conveying surface.

It is noted that the apparatus of the present invention is configured for forming a film or skin on a part of the circumference of the at least one piece of dough is facing the contact surface and thus facing away from the conveying surface. In order to profit from the non-stickiness of the part of the at least one piece of dough provided with the film or skin, the at least one piece of dough is preferably turned in order to arranged the film or skin at the bottom side of the at least one piece of dough.

In an embodiment, in a direction downstream of the heating device, the at least one piece of dough is transferred from the conveying surface of the conveyor to a further carrier or support. The placement of the at least one piece of dough onto the further carrier or support is preferably made by rotating the piece of dough, and is preferably configured to arrange the piece of dough onto said further carrier or support so that the part of the piece of dough provided with the film contacts or abuts the carrier or support. Accordingly, the apparatus itself does not necessarily require a special turning device for arranging the film or skin at the bottom side of the at least one piece of dough.

Additionally or alternatively, the apparatus comprises a turning device which is configured for turning the at least one piece of dough for arranging the film or skin at the bottom side of the at least one piece of dough. In an embodiment, the turning device configured for turning the at least one dough piece substantially upside down. In an embodiment, the turning device is arranged downstream of the heating device. In an embodiment, the turning device is arranged for turning the at least one piece of dough for arranging the film or skin onto the conveying surface of the conveyor. Accordingly, the at least one piece of dough is turned in order to arranged the film or skin at the bottom side of the at least one piece of dough before it leaves the apparatus.

In an embodiment, the turning device comprises a turning plate or a turning conveyor extending perpendicularly to said conveyor belt above said at least one piece of dough, wherein said turning plate or the belt of the turning conveyor is configured for providing a transverse rectilinear movement for rolling the at least one piece of dough in a direction substantially perpendicular to the conveying direction.

Additionally or alternatively, the substrate is configured for turning the at least one piece of dough for arranging the film or skin at the bottom side of the at least one piece of dough. In an embodiment, the substrate is configured for turning the at least one piece of dough substantially upside down. Accordingly, the relative movement between the contact surface and the conveying surface can also be used for turning the at least one piece of dough for arranging the film or skin at the bottom side of the at least one piece of dough. In this case, the relative movement between the contact surface and the conveying surface is relatively high in order to substantially prevent the formation of a film or skin on other parts of the circumference of the at least one dough piece.

In an embodiment, at least the contact surface is configured for substantially preventing a slip between the at least one piece of dough and the contact surface. In an embodiment, at least the contact surface is provided with rough and/or abrasive surface texture. In case there is a slip between the at least one piece of dough and the contact surface, the amount of slip is usually arbitrary and/or ill-defined, and the position and/or rotation of the at least one piece of dough on the conveying surface becomes uncertain and/or undefined. This may cause problems when handling the at least one piece of dough downstream the apparatus. By providing the contact surface with a rough and/or abrasive surface texture, preferably in order to provide a suitable amount of friction between the at least one piece of dough and the contact surface, a slip is substantially prevented.

In an embodiment, conveyor comprises a conveyor belt, wherein the conveyor belt provides the conveying surface.

According to a second aspect, the present invention provides a method for the industrial manufacture of bakery products, such as long or elongated breads, rolls, baguettes, Parisian breads, round loaves, etc . . . , is provided. The method comprises the steps of:

conveying at least one piece of dough on a conveying surface of a conveyor in a transport direction,
heating at least a part of a circumference of the at least one piece of dough for forming a film on said part of the circumference of the at least one piece of dough, wherein said part of the circumference of the at least one piece of dough is facing a contact surface of a substrate, wherein said substrate is arranged above said conveyor, wherein the contact surface is configured for touching an upper side of said at least one piece of dough on said conveying surface, providing a rectilinear alternating movement between the contact surface and the conveying surface in a direction substantially parallel to the conveying surface and substantially perpendicular to the transport direction, at least during the heating of at least part of the circumference of the at least one piece of dough.

Accordingly, a method is provided for heating at least one piece of dough via contact of a part of the upper side of the at least one piece of dough with the substrate, in order to form a film or skin on said part of the upper side of the at least one piece of dough. In industrial manufacture of bakery products, the dough pieces are commonly conveyed through the assembly for manufacture of bakery products by means of conveyors. The conveyed dough pieces lie directly on said conveyors or on dough carriers, such as proofing or baking trays. Accordingly the upper side of the dough pieces is usually readily accessible for a contact surface of a substrate to abut against the upper side of at least one of said dough pieces for heating the upper side of said at least one of said dough pieces for forming a skin or film on said upper side of the at least one of said dough pieces. The part of the circumference of the at least one of said dough pieces at which the skin or film has been formed, the at least one of said dough pieces is much less sticky, and said part of the circumference of the at least one of said dough pieces comprising the skin or film can readily be used for positioning the dough pieces onto a conveyor or dough carrier downstream of the substrate. Due to the skin or film it is at least substantially prevent that pieces of dough stick to the conveyors or dough carriers, and the conveyors or dough carriers can be used substantially without needing flouring either the dough pieces itself or the conveyor or dough carriers. Not just preventing sticking also to create the possibility to proof and bake the dough pieces in or on a so called fluted tray (corrugated plate) or flat tray without (small) holes. This normally creates humidity (sweating) of the dough pieces at the bottom what creates so called craters because of the water starts cooking during baking. The current used trays with small holes indicates that the product is industrial processed what is against the market trends. The dough pieces provided with the skin or film according to the present invention will have a stone baked appearance after bake what is preferred in some occasions.

In an embodiment, the method further comprising the steps of:
conveying the at least one piece of dough under said substrate which is held perpendicularly above the conveying surface at a distance greater than the thickness of said at least one piece of dough;
lowering the substrate for touching the upper side of said at least one piece of dough on said conveying surface;
providing the rectilinear alternating movement between the contact surface and the conveying surface, preferably over a distance smaller than the length of the circumference of the at least one dough piece;
raising the substrate after a filming duration and/or a determined number of alternating translation cycles.

In an embodiment, the rectilinear alternating movement between the contact surface and the conveying surface is over a distance smaller than half the length of the circumference of the at least one dough piece. Accordingly, the film forming is limited in circumferential direction to said distance smaller than half the length of the circumference. This part of the circumference on which the film is formed will constitute to bottom surface of the baked product. The part of the circumference on which the film is not formed will comprise the top surface of the baked product. Since this part is preferably not provided with a film the top surface of the at least one dough piece can easily be provided with incision and/or decorations.

In an embodiment, the method comprises the step of: turning the at least one piece of dough for arranging the film or skin to contact or lie on the conveying surface. By arranging the part of the at least one piece of dough comprising the film or skin to abut the conveying surface, adhesion or sticking of the pieces of dough to carriers or supports can at least substantially be prevented. In addition, when using a carrier or support with perforations and/or surface profiles it can at least substantially be prevented that the perforations and/or surface profiles provide an imprint in the bottom surface of the at least one piece of dough. Accordingly, there is substantially no indications or marks on the bottom side of the baked product which would suggest that during the manufacturing of the dough product a carrier or support with perforations and/or surface profiles has been used. The baked product has the appearance of an artisanal baked product.

In an embodiment, the contact surface of the substrate is heated to a temperature of between 80° C. and 180° C., preferably to a temperature of between 90° C. and 150° C.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
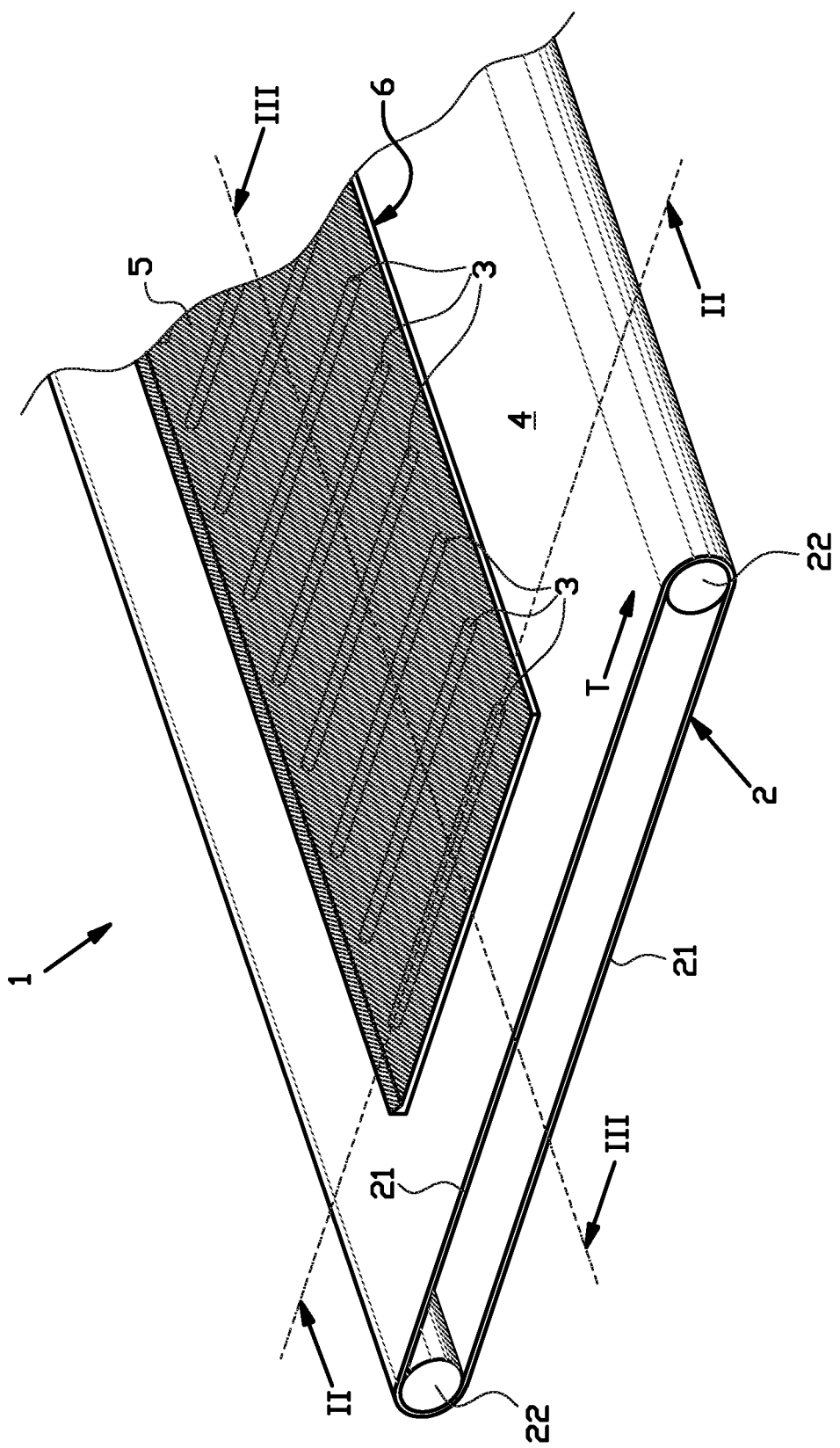
FIG. 1 schematically shows a first example of an apparatus for forming a film on a part of the circumferential surface of dough pieces.

FIG. 1 shows a first example of an apparatus 1 for the industrial manufacture of bakery products, such as long or elongated breads, rolls, baguettes, Parisian breads, round loaves, etc. . . . The apparatus 1 comprises a conveyor 2 for conveying at least one piece of dough 3 on a conveying surface 4 in a conveying direction T. The conveyor 2 comprises a conveyor belt 21 which is arranged around return rollers 22, wherein the conveyor belt 21 provides the conveying surface 4. Preferably, the conveyor belt 21 is sufficiently rigid for carrying the pieces of dough 3, substantially without sagging between the return rollers 22. Alternatively, a carrying member 23 may be arranged to provide a rigid support for the upper branch of the conveyor 21, as schematically indicated with the dotted line in FIGS. 2 and 3.

Above and spaced apart from the conveying surface 4, a substrate 5 is arranged. The substrate 5 comprises a contact surface 6 at a side of said substrate 5 facing the conveying surface 4. In between the conveying surface 4 and the contact surface 6, a passage 7 for at least one piece of dough 3 is defined. The apparatus 1 is configured for providing a relative movement between the contact surface 6 and the conveying surface 4, in particular between the substrate 5 and the conveying surface 4. The contact surface 6 is configured for touching an upper side 8 of said at least one piece of dough 3 on said conveying surface 4.

The apparatus 1 further comprises a heating device 9, which in this example is arranged inside the substrate 5 for heating at least the contact surface 6 of the substrate 5. The heating device 9 comprises for example an electrical heating device which is configured for heating the contact surface 6 of the substrate 5 to a temperature of between 80° C. and 180° C., preferably to a temperature of between 90° C. and 150° C. In use, when at least one piece of dough 3 is arranged between the conveying surface 4 and the contact surface 6, the part of the contact surface 6 that touches the upper side 8 of the at least one piece of dough 3 will heat the upper side 8 of the at least one piece of dough 3. Due to the heating of the upper side 8 by the heated contact surface 6 during a certain amount of time, a film or skin is formed at the upper side 8 of the circumference of the at least one dough piece 3, as described later in more detail with reference to FIGS. 7A, 7B and 7C.

Figure 2:
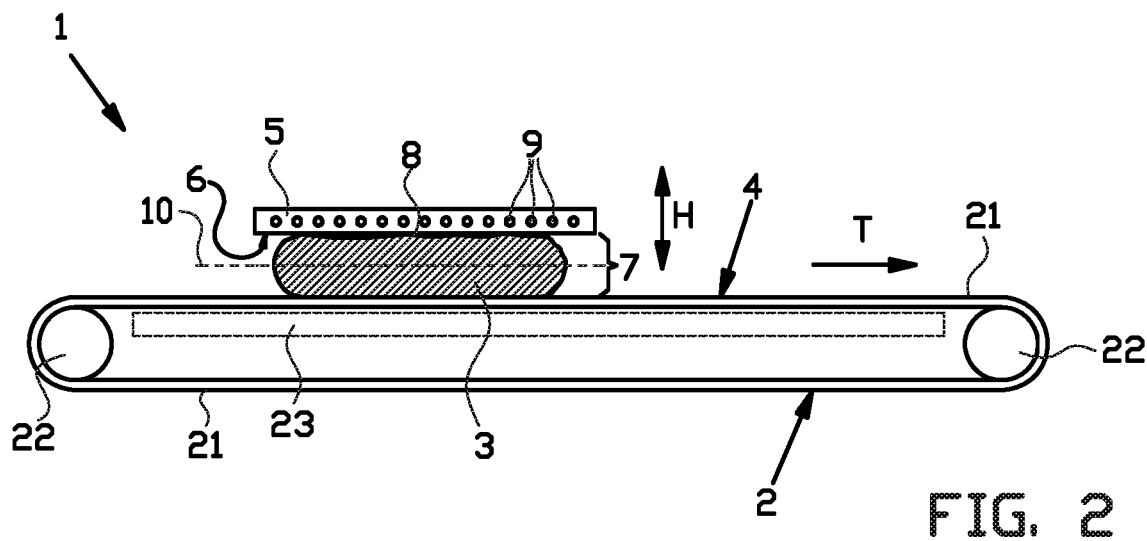
FIG. 2 schematically shows a cross section along the line II-II in FIG. 1.
Figure 3:
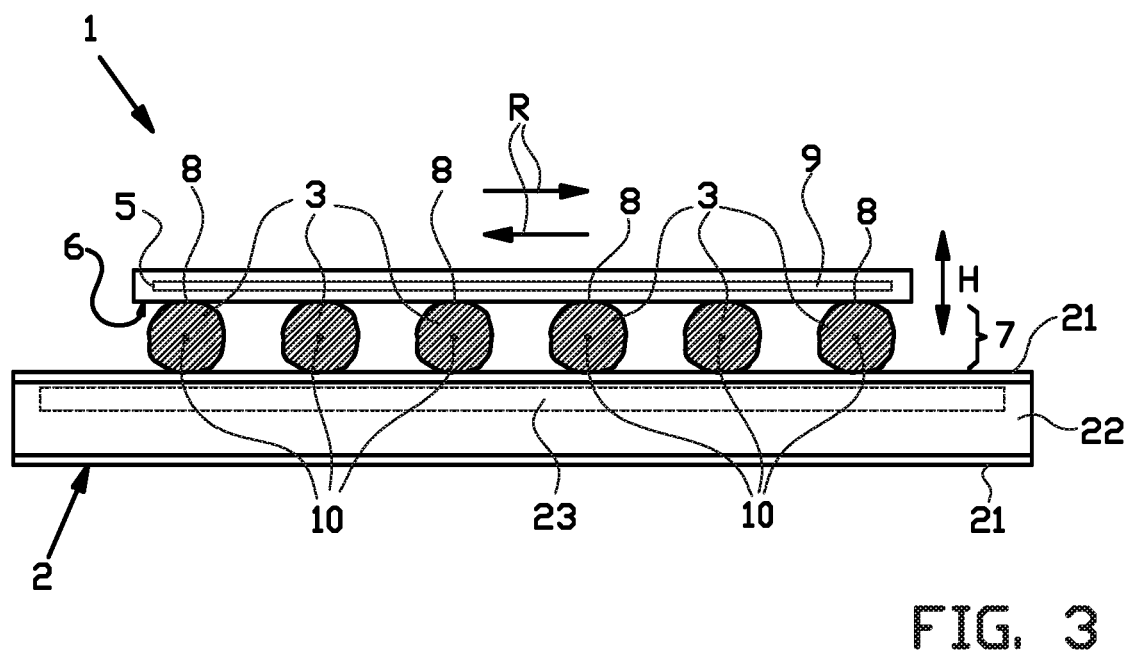
FIG. 3 schematically shows a cross section along the line III-III in FIG. 1.

As schematically shown in FIGS. 1, 2 and 3, the apparatus 1 is configured for handling dough pieces 3 having a central axis 10 and which are substantially cylindrical around said central axis 10. The apparatus 1 is configured for arranging the dough pieces 3 in a substantially parallel arrangement onto the conveying surface 4 with their central axis 10 substantially parallel to the conveying surface 4. In this example the dough pieces 3 are arranged such that their central axis 10 extends in a direction substantially parallel to the conveying direction T.

In order to form a film or skin on a part of the upper side 8 of the at least one piece of dough 3, the substrate is configured for providing a relative movement between the contact surface 6 and the conveying surface 4 in a direction substantially parallel to the conveying surface 4 and substantially transverse to the central axis 10. In the example of FIGS. 1, 2 and 3 the substrate 5 is configured for providing a reciprocal motion R in a direction transverse to the conveyance direction T.

During the formation of the film or skin on the upper side 8, the conveyance of the pieces of dough 3 on the conveying surface 4 is substantially stopped, or the substrate 5 is moved along with the conveying surface 4, so that there is substantially no relative movement between the contact surface 6 and the conveying surface 4 in the conveyance direction T.

When the film or skin forming process has been completed, the substrate 5 may be moved away from the pieces of dough 3, in particular in a direction H substantially transverse to the conveying surface 4.

Figure 4:
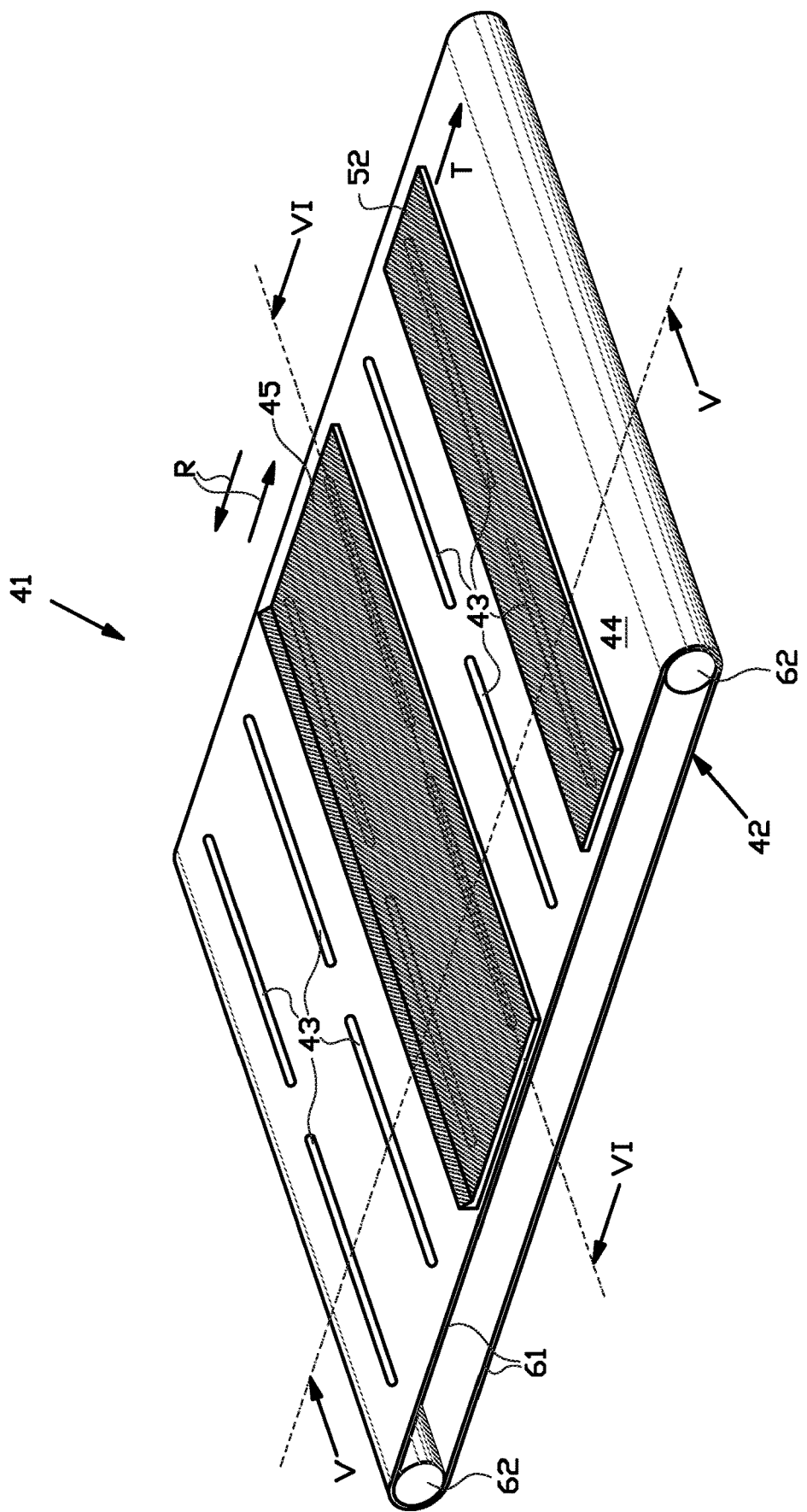
FIG. 4 schematically shows a second example of an apparatus for forming a film on a part of the circumferential surface of dough pieces.

FIG. 4 shows a second example of an apparatus 41 for the industrial manufacture of bakery products, such as long or elongated breads, rolls, baguettes, Parisian breads, round loaves, etc. . . . Again, the apparatus 41 comprises a conveyor 42 for conveying at least one piece of dough 43 on a conveying surface 44 in a conveying direction T. The conveyor 42 comprises a conveyor belt 61 which is arranged around return rollers 62, wherein the conveyor belt 41 provides the conveying surface 44. In between the return rollers 62 a carrying member 63 is arranged to provide a rigid support of the upper branch of the conveyor 61, as schematically indicated in FIGS. 5 and 6.

Above and spaced apart from the conveying surface 44, a substrate 45 is arranged. The substrate 45 comprises a contact surface 46 at a side of said substrate 45 facing the conveying surface 44. In between the conveying surface 44 and the contact surface 46, a passage 47 for at least one piece of dough 43 is defined. The apparatus 41 is configured for providing a relative movement between the contact surface 46 and the conveying surface 44, in particular between the substrate 45 and the conveying surface 44. The contact surface 46 is configured for touching an upper side 48 of said at least one piece of dough 43 on said conveying surface 4.

The apparatus 41 further comprises a heating device 49, which in this example is arranged inside the substrate 45 for heating at least the contact surface 46 of the substrate 45. The heating device 49 comprises for example an induction heating, wherein the substrate 45 at or near the contact surface 46 comprises one or more electrically conducting objects 50 in which heat is generated by the induction heating. An advantage of such induction heating is, that the one or more electrically conducting objects 50 can be heated very rapidly. The induction heating device 49 which is configured for heating the contact surface 46 of the substrate 45 to a temperature of between 80° C. and 180° C., preferably to a temperature of between 90° C. and 150° C. In use, when at least one piece of dough 43 is arranged between the conveying surface 44 and the contact surface 46, the part of the contact surface 46 that touches the upper side 48 of the at least one piece of dough 43 will heat the upper side 48 of the at least one piece of dough 43. Due to the heating of the upper side 48 by the heated contact surface 46 during a certain amount of time, a film or skin is formed at the upper side 48 of the circumference of the at least one dough piece 43, as described later in more detail with reference to FIGS. 7A, 7B and 7C.

Figure 5:
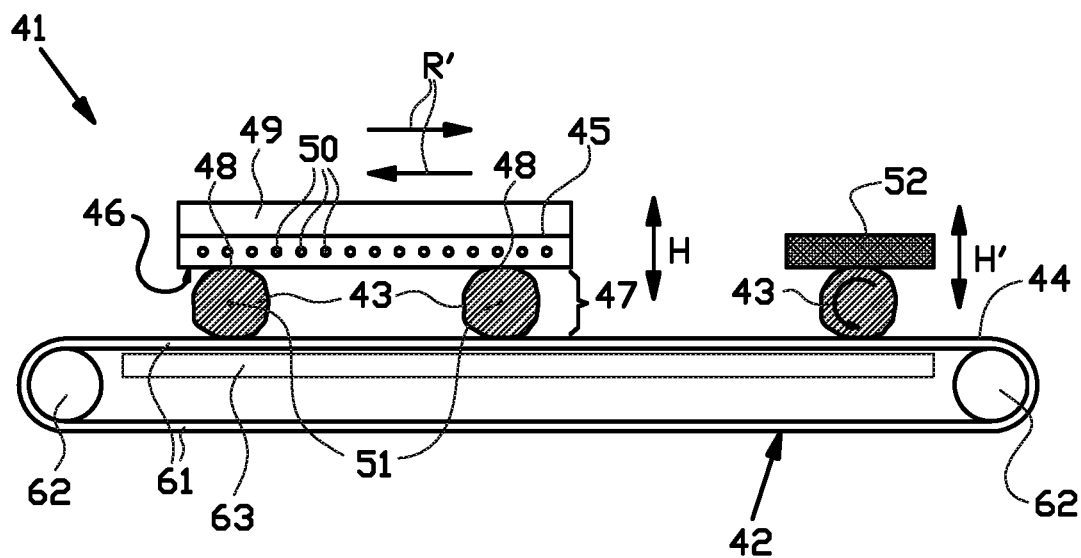
FIG. 5 schematically shows a cross section along the line V-V in FIG. 4.
Figure 6:
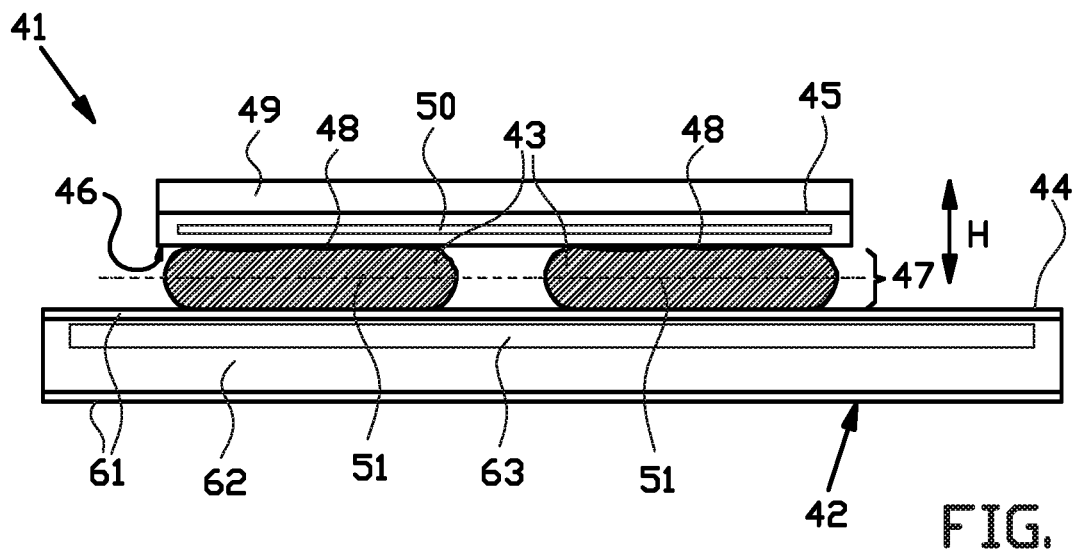
FIG. 6 schematically show a cross section along the line VI-VI in FIG. 4.

As schematically shown in FIGS. 4, 5 and 6, the apparatus 41 is configured for handling dough pieces 43 having a central axis 51 and which are substantially cylindrical around said central axis 51. The apparatus 41 is configured for arranging the dough pieces 43 in a substantially parallel arrangement onto the conveying surface 44 with their central axis 51 substantially parallel to the conveying surface 44. In this second example the dough pieces 43 are arranged such that their central axis 51 extends in a direction substantially perpendicular to the conveying direction T.

In order to form a film or skin on a part of the upper side 48 of the at least one piece of dough 43, the substrate is configured for providing a relative movement between the contact surface 46 and the conveying surface 44 in a direction substantially parallel to the conveying surface 44 and substantially transverse to the central axis 51. In the example of FIGS. 4, 5 and 6 the substrate 45 is configured for providing a reciprocal motion R in a direction parallel to the conveyance direction T.

During the formation of the film or skin on the upper side 48,
the conveyance of the pieces of dough 43 on the conveying surface 44 is substantially stopped, or
the substrate 45 is moved in a reciprocating fashion along with the conveying surface 44, so that there is substantially the reciprocating movement between the contact surface 46 and the conveying surface 44 in the conveyance direction T.

When the film or skin forming process has been completed, the substrate 45 may be moved away from the pieces of dough 43, in particular in a direction H substantially transverse to the conveying surface 44.

The apparatus 41 according to this second example is provided with a turning device 52 is arranged downstream of the substrate 45 with the heating device 49. The turning device 52 is configured for turning the at least one piece of dough 43 for moving the upper side 48 with the film or skin to the bottom side of the at least one piece of dough 43. In particular, the turning device 52 comprises a plate which is arranged at a substantially stationary position above the conveying surface 44. Due to the relative movement of the support surface 46 in the conveyance direction T and the stationary plate of the turning device 52, the pieces of dough 43 between the plate and the conveying surface 46 are being rotated. As schematically indicated in FIG. 5, the plate of the turning device 52 is movable in a vertical direction H' in order to move the plate away from the pieces of dough 43 after the rotation of the pieces of dough 43 has been completed and the circumferential part of the pieces of dough 43 with the film or skin is arranged abutting the conveying surface 44.

Figure 7:
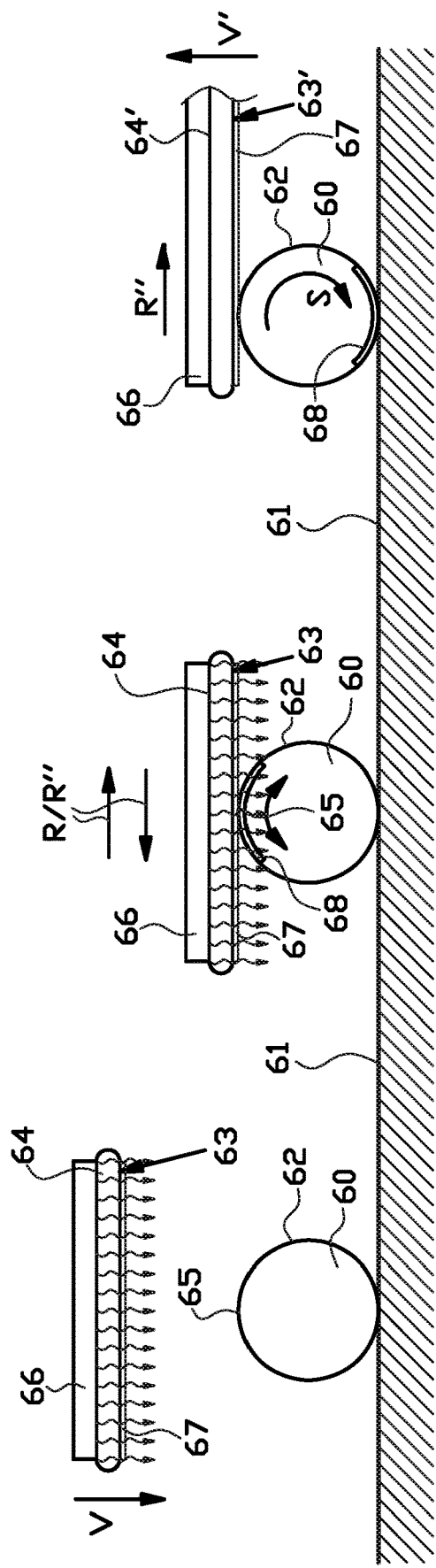
FIGS. 7A, 7B and 7C schematically show different steps in a method for forming a film on a part of the circumferential surface of dough pieces.

FIGS. 7A, 7B and 7C schematically show different steps in a method for forming a film or a skin on a part of the circumferential surface of dough pieces. The method comprises the steps of:
conveying at least one piece of dough 60 on a conveying surface 61 of a conveyor in a transport direction T,
heating at least a part of a circumference 62 of the at least one piece of dough 60 for forming a film or skin on said part 62 of the circumference of the at least one piece of dough 60, wherein said part of the circumference 62 of the at least one piece of dough 60 is facing a contact surface 63 of a substrate 64, wherein said substrate 64 is arranged above said conveying surface 61, and wherein the contact surface 63 is configured for touching an upper side 65 of said at least one piece of dough 60 on said conveying surface 61.

In particular, FIG. 7A shows a piece of dough 60 arranged on top of a conveying surface 61, which may be part of a conveyor belt or a dough carrier or tray. Above the conveying surface 61, a substrate 64 is arranged. The substrate 64 comprises a contact surface 63 at a side of said substrate 64 which faces the conveying surface 61. In addition, the substrate 64 is provided with a heating device, an induction heating device 66, wherein at least the part of the substrate 64 at or near the contact surface 63 is made from an electrically conducting material in which heat is generated by the induction heating 66. Preferably, the induction heating device 66 is configured for heating the contact surface 63 of the substrate 64 to a temperature of between 80° C. and 180° C., preferably to a temperature of between 90° C. and 150° C.

In addition, the substrate 64 is provided with a slip preventing layer 67 or slip preventing surface texture at the side facing the conveying surface 61. The slip preventing layer 67 or slip preventing surface texture is configured for substantially preventing a slip between the at least one piece of dough 65 and the contact surface 63. An example of such a slip preventing layer 67 is a rough and/or coarse Teflon coating. Such a coating comprises for example an amount of particles, such as sand, silicon or silicon carbide particles. Accordingly, the contact surface 63 is provided with rough and/or abrasive surface texture.

As schematically indicated in FIG. 7A, the substrate 64 is configured for providing a relative movement between the substrate 64 and the conveying surface 61 in a direction towards V the conveying surface 61. Accordingly, the substrate 64 is moved towards the conveying surface 61 until the contact surface 63 of the substrate 64 abuts the upper side 65 of said at least one piece of dough 60 on said conveying surface 61.

As schematically indicated in FIG. 7B, the substrate 64 with its heating device 66 is lowered onto the upper side 65 of said at least one piece of dough 60. At least the part of the contact surface 63 which touches the upper side 65 of the at least one piece of dough 60 heats said part. In order to extend the heated part over a certain area of the circumference of the at least one piece of dough 60, a relative movement R, R' between the substrate 64 and the conveying surface 61 is provided. In case of a substantially cylindrical piece of dough, the substrate 64 is configured for providing a motion R, R' in a direction substantially parallel to the conveying surface 61 and substantially perpendicular to a center line of said cylindrical piece of dough. When the substrate 64 performs a movement with respect to the conveying surface and in a direction substantially parallel to the conveying surface, the at least one piece of dough 60 in between said contact surface 63 and said conveying surface 61 performs a rolling movement over the conveying surface 61. The amplitude of said motion R is selected so that the desired part of the upper side 65 receives the required heat treatment in order to form a skin or film 68 at the upper part of the circumference of the piece of dough 60.

It is noted that for the formation of the skin or film 68 at the circumference of the piece of dough 60 the upper side 65 of said at least one piece of dough 60 needs to be heated for a certain time period. This time period can be established by slowly moving the substrate 64 with respect to the conveying surface 61, and/or by using a reciprocal movement of the substrate 64 with respect to the conveying surface 61.

When the required part of the circumference of the at least one piece of dough 60 is provided with the skin or film 68, the piece of dough 60 can be turned over so that the skin or film 68 is positioned at the bottom side of the piece of dough 60. As described above, this turning can be done when the piece of dough 60 is transferred from the conveying surface 61 onto a further conveyor or dough carrier or tray. Alternatively, a dedicated turning device can be used as shown for example in FIGS. 4 and 5. However, as schematically shown in FIG. 7C, also the substrate 64 can be used to provide one stroke in the direction R" substantially parallel to the conveying surface. The amplitude of said stroke in the direction R" is selected such that the at least one piece of dough 60 is rotated S over an angle of substantially 180 degrees, so that the skin or film 68 is arranged at the bottom side of the piece of dough 60.

Subsequently, the substrate 64 can be moved in a direction V' away from the conveying surface 61, in particular in an upward direction. Accordingly the substrate 64 releases the at least one dough piece 60, which at least one dough piece 60 is then conveyed further to the different stages of the assembly for the industrial manufacture of bakery products, such as proofing in a proofing cabinet and baking in an oven.

It is noted that, because the skin or film 68 is preferably established only on a part of the circumference of the piece of dough, which part is arranged at the bottom side of the piece of dough, the other parts of the circumference of the piece of dough is substantially untreated which allows the piece of dough to expand substantially in a normal manner during the proofing of the piece of dough.

Figure 8:
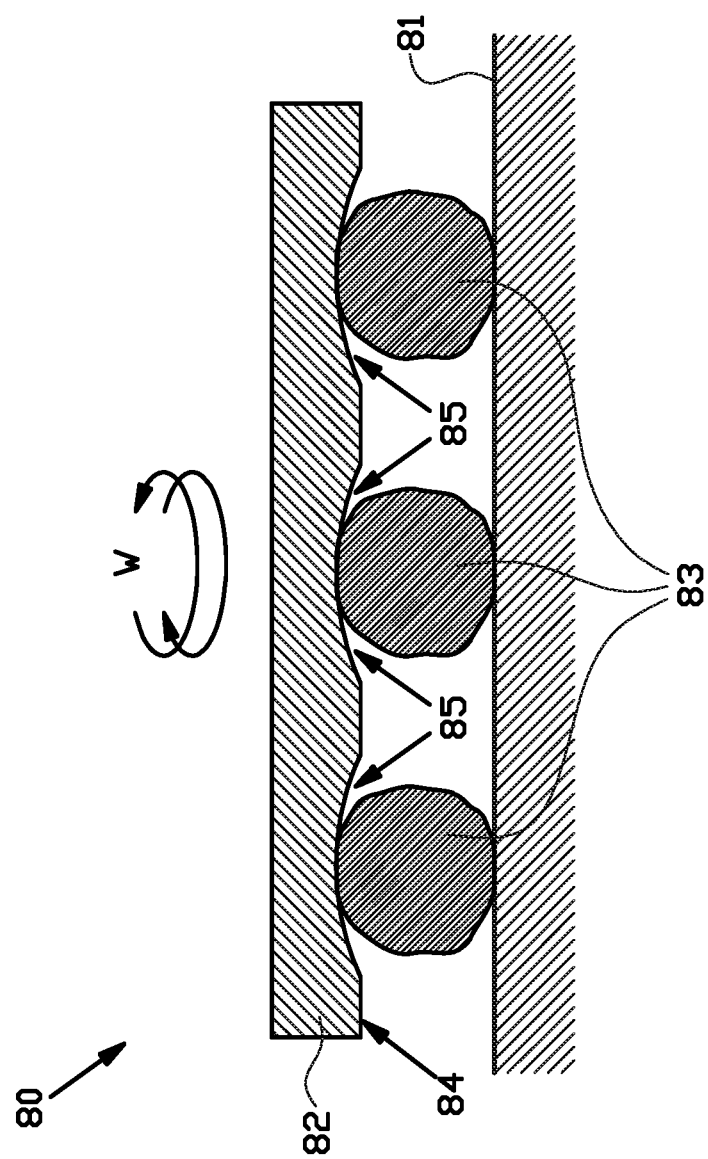
FIG. 8 schematically shows a cross section of a third example of an apparatus for forming a film on a part of the circumferential surface of dough pieces.

It is noted, that in the previously described examples the contact surface 6, 46, 63 of the substrate 5, 45, 64 is substantially flat, except for an optional rough and/or abrasive surface texture. However, the contact surface 63 is not limited to substantially flat surfaces. As shown in the example of FIG. 8, the contact surface 84 may also be provided with one or more cells or indentations 85, preferably adapted to the shape of at least the upper side of the pieces of dough 83. Such a shaped contact surface 84 may provide a larger area of contact between the contact surface 63 and the upper side of the pieces of dough 83.

It is further noted, that in the previously described examples the contact surface 6, 46, 63 and the conveying surface 4, 44, 61 are configured for moving with respect to each other in a substantially straight movement R, R', R". In an alternative embodiment, the contact surface 84 and the conveying surface 81 can also be arranged for moving with respect to each other in a substantially circular motion W, for example for rolling bolls of dough 83 between the substrate 82 and the conveying surface 81, as schematically shown in FIG. 8.

Furthermore, that in the previously described examples the contact surface 6, 46, 63 and the conveying surface 4, 44, 61 are configured to extend in substantially parallel planes. However, the contact surface may also be arranged at a sharp angle with respect to the conveying surface, for example for handling cone shaped pieces of dough.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An apparatus for the industrial manufacture of bakery products, said apparatus comprising:
   a conveyor for conveying at least one piece of dough on a conveying surface in a transport direction,
   a substrate which is arranged above said conveyor, wherein the substrate comprises a contact surface at a side facing the conveyor, wherein the apparatus is configured for providing a relative movement between the contact surface and the conveying surface, wherein the contact surface is configured for touching an upper side of said at least one piece of dough on said conveying surface,
   a heating device configured for heating at least a part of a circumference of the at least one piece of dough facing the contact surface for forming a film on said part of the circumference, and
   wherein the apparatus is configured for providing a rectilinear alternating movement between the contact surface and the conveying surface in a direction substantially parallel to the conveying surface and substantially perpendicular to the transport direction.

2. The apparatus according to claim 1, wherein the heating device is configured for heating at least a part of the contact surface of the substrate.

3. The apparatus according to claim 1, wherein the heating device is configured for heating the contact surface of the substrate to a temperature of between 80° C. and 180° C.

4. The apparatus according to claim 1, wherein the apparatus comprises a driving unit for subjecting the contact surface to the rectilinear alternating movement in the direction substantially parallel to the conveying surface and substantially perpendicular to the transport direction.

5. The apparatus according to claim 1, wherein the apparatus is configured for moving the contact surface in a direction substantially transverse to the conveying surface.

6. The apparatus according to claim 5, wherein the apparatus comprises an actuator for raising and lowering the contact surface with respect to the conveying surface.

7. The apparatus according to claim 1, wherein the substrate comprises a plate.

8. The apparatus according to claim 1, wherein the apparatus is configured for handling dough pieces having a central axis and which are substantially cylindrical around said central axis,
   wherein apparatus is configured for arranging the dough pieces in a substantially parallel arrangement onto the conveying surface with their central axis substantially parallel to the conveying surface,
   wherein the apparatus is configured for providing a relative movement between the contact surface and the conveying surface in a direction substantially transverse to the central axis and parallel to the conveying surface.

9. The apparatus according to claim 1, wherein the apparatus comprises a turning device which is configured for turning the at least one piece of dough for arranging the film or skin at the bottom side of the at least one piece of dough.

10. The apparatus according to claim 9, wherein the turning device is arranged downstream of the heating device.

11. The apparatus according to claim 9, wherein the turning device comprises a turning plate or a turning conveyor extending perpendicularly to said conveyor belt above said at least one piece of dough,
    wherein said turning plate or the belt of the turning conveyor is configured for providing a transverse rectilinear movement for rolling the at least one piece of dough in a direction substantially perpendicular to the conveying direction.

12. The apparatus according to claim 1, wherein the substrate is configured for turning the at least one piece of dough for arranging the film or skin at the bottom side of the at least one piece of dough.

13. The apparatus according to claim 1, wherein the contact surface is configured for substantially preventing a slip between the at least one piece of dough and the contact surface.

14. The apparatus according to claim 1, wherein the contact surface is provided with rough and/or abrasive surface texture.

15. The apparatus according to claim 1, wherein conveyor comprises a conveyor belt, wherein the conveyor belt provides the conveying surface.

16. A method for the industrial manufacture of bakery products, the method comprises the steps of:
    conveying at least one piece of dough on a conveying surface of a conveyor in a transport direction,
    heating at least a part of a circumference of the at least one piece of dough for forming a film on said part of the circumference of the at least one piece of dough, wherein said part of the circumference of the at least one piece of dough is facing a contact surface of a substrate, wherein said substrate is arranged above said conveyor, wherein the contact surface is configured for touching an upper side of said at least one piece of dough on said conveying surface, providing a rectilinear alternating movement between the contact surface and the conveying surface in a direction substantially parallel to the conveying surface and substantially perpendicular to the transport direction, at least during the heating of at least a part of the circumference of the at least one piece of dough.

17. The method according to claim 16, further comprising the steps of:

conveying the at least one piece of dough under said substrate which is held perpendicularly above the conveying surface at a distance greater than the thickness of said at least one piece of dough;

lowering the substrate for touching the upper side of said at least one piece of dough on said conveying surface;

providing the rectilinear alternating movement between the contact surface and the conveying surface; and raising the substrate after a filming duration and/or a determined number of alternating translation cycles.

18. The method according to claim 16, wherein the rectilinear alternating movement between the contact surface and the conveying surface is over a distance smaller than half the length of the circumference of the at least one dough piece.

19. The method according to claim 16, wherein the method comprises the step of:

turning the at least one piece of dough for arranging the film or skin to contact or abut on the conveying surface.

20. The method according to claim 16, wherein the contact surface of the substrate is heated to a temperature of between 80° C. and 180° C.

* * * * *